United States Patent
Li

(10) Patent No.: US 8,401,016 B2
(45) Date of Patent: Mar. 19, 2013

(54) METHOD, SYSTEM AND PEER DEVICE FOR MESSAGE ROUTING

(75) Inventor: Feng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 12/692,877

(22) Filed: Jan. 25, 2010

(65) Prior Publication Data

US 2010/0118874 A1  May 13, 2010

Related U.S. Application Data

(63) Continuation of application No. PCT/CN2008/071764, filed on Jul. 25, 2008.

(30) Foreign Application Priority Data

Jul. 25, 2007  (CN) .......................... 2007 1 0130785

(51) Int. Cl.
  *H04L 12/28* (2006.01)
  *H04L 12/56* (2006.01)
(52) U.S. Cl. ........................ 370/392; 370/389
(58) Field of Classification Search ................. 370/389, 370/392
  See application file for complete search history.

(56) References Cited

U.S. PATENT DOCUMENTS

| | | | |
|---|---|---|---|
| 7,280,486 B2 | 10/2007 | Suri | |
| 7,417,981 B2 | 8/2008 | Holder et al. | |
| 2005/0036470 A1* | 2/2005 | Calvert | 370/338 |
| 2006/0050648 A1 | 3/2006 | Eydelman | |
| 2007/0177511 A1* | 8/2007 | Das et al. | 370/238 |
| 2008/0019361 A1 | 1/2008 | Suri | |
| 2008/0031237 A1* | 2/2008 | Liu | 370/389 |

(Continued)

FOREIGN PATENT DOCUMENTS

| | | |
|---|---|---|
| CN | 1645838 A | 7/2005 |
| CN | 1747456 A | 3/2006 |

(Continued)

OTHER PUBLICATIONS

David B. Johnson, David A. Maltz, and Yih-Chun Hu. The Dynamic Source Routing (DSR) Protocol for Mobile Ad Hoc Networks for IPv4 networks. Networks Working Group RFC 4728, Feb. 2007.*

(Continued)

*Primary Examiner* — Ayaz Sheikh
*Assistant Examiner* — Tarell Hampton
(74) *Attorney, Agent, or Firm* — Leydig, Voit & Mayer, Ltd.

(57) ABSTRACT

A method for message routing in a Peer to Peer (P2P) network includes the following steps: when a request message is routed from a source peer to a destination peer, the source peer and every intermediate peer that needs to be recorded add path information of the local peer to the request message and forward the request message to a next hop until the message arrives at the destination peer, where the path information includes a communication address of the local peer; the destination peer adds the path information in the request message to a response message obtained according to the request message; and the response message is routed from the destination peer to the source peer according to the path information. A source peer, an intermediate forwarding peer, and a destination peer as well as a message routing system are also disclosed. With the present invention, recursive message routing is implemented in a structured P2P network. Because a peer in the P2P network no longer needs to maintain a local transaction table, resources of the peer are saved and the cost of the P2P network is less.

14 Claims, 10 Drawing Sheets

U.S. PATENT DOCUMENTS

2008/0112435 A1* 5/2008 Liu et al. .................. 370/474
2008/0181375 A1 7/2008 Holder et al.

FOREIGN PATENT DOCUMENTS

| CN | 1883179 | A | 12/2006 |
|---|---|---|---|
| CN | 1894895 | A | 1/2007 |
| CN | 1960313 | A | 5/2007 |
| CN | 101355490 | B | 5/2012 |
| WO | 2005/041534 | A1 | 5/2005 |
| WO | WO 2007/034313 | A1 | 3/2007 |

OTHER PUBLICATIONS

European Patent Office, Examination Report in European Patent Application No. 08783757.1 (Jun. 29, 2010).

State Intellectual Property Office of the People's Republic of China, English Translation of Written Opinion of the International Searching Authority in International Patent Application No. PCT/CN2008/071764 (Nov. 13, 2008).

Bryan et al., "Resource Location and Discovery (RELOAD); draft-bryan-p2psip-reload-01.t," IETF Standard-Working-Draft, Internet Engineering Task Force, IETF, CH, No. 1 (Jul. 8, 2007) XP015050797.

Hu et al., "Exploiting the Sunergy Between Peer-to-Peer and Mobile Ad Hoc Networks," USENIX Association, $9^{th}$ Workshop on Hot Topics in Operating Systems (Mar. 18, 2003) XP002291694.

Baset et al., "Peer-to-Peer Protocol (P2PP).txt," P2PSIP Working Groups, Internet Draft (Aug. 5, 2007).

$1^{st}$ Office Action in corresponding Chinese Application No. 200710130785.4 (Mar. 15, 2011).

* cited by examiner

METHOD, SYSTEM AND PEER DEVICE FOR MESSAGE ROUTING

CROSS-REFERENCE TO RELATED APPLICATIONS

This application is a continuation of International Patent Application No. PCT/CN 2008/071764, filed Jul. 25, 2008, which claims priority to Chinese Patent Application No. 200710130785.4, filed Jul. 25, 2007, both of which are hereby incorporated by reference in their entireties.

FIELD OF THE INVENTION

The present invention relates to communication technologies, and in particular, to a method, system and peer device for message routing in a structured Peer to Peer (P2P) network.

BACKGROUND OF THE INVENTION

The P2P technology fully utilizes the capabilities of every peer in a system so that the peers provide services for each other. The P2P technology can significantly increase the utilization of the peers and further help improve the efficiency of the network, devices and information services. P2P systems include structured, unstructured and loosely structured systems. In a structured P2P system, the publication of resources is closely related to the network topology and resources are distributed in the network precisely according to the logical addresses in the P2P topology. In the system, every peer has a virtual logical address and all peers compose a relatively stable and close topological structure according to their addresses. In a structured P2P system, a Hash algorithm is applied to a resource to generate a key. Because the name space of keys is mapped to the name space of peers, the resources are distributed in the structured P2P system according to the keys and the mapping and a resource can be found in the P2P network by means of its key.

An important P2P function is the routing of protocol messages between peers during a communication process. In a structured P2P system, when the source peer of a message needs to acquire a resource stored in a destination peer, it is necessary to route the request message to the destination by way of several peers according to the key and the hash algorithm and route the response message back to the source peer. In the routing process, some peers are probably behind a Network Address Translation (NAT) device or a Firewall (FW). Therefore, NAT and FW traversal must also be considered in the routing process.

At present, routing modes in a P2P system include recursive routing, semi-recursive routing and iterative routing.

A recursive routing process is shown in FIG. 1, where peer A sends a message to peer D and receives a response. The principle of recursive routing is as follows: a peer receiving a message checks whether the message is destined for itself and if so, the peer ends the routing or else the peer forwards the message to a peer closer to the destination according to its routing table; the response message is returned in the same route. The major requirement of recursive routing is NAT and FW traversal, which can guarantee that the response message is routed back to the requesting peer.

A semi-recursive routing process is shown in FIG. 2, where peer A sends a message to peer D and receives a response. The principle of semi-recursive routing is as follows: a peer receiving a message checks whether the message is destined for itself and if so, the peer ends the routing or else the peer forwards the message to a peer closer to the destination according to its routing table; the response message is directly returned to the requesting peer.

An iterative routing process is shown in FIG. 3, where peer A sends a message to peer D and receives a response. The routing principle is as follows: a peer receiving a message checks whether the message is destined for itself and if so, the peer ends the routing or else, the peer notifies the requesting peer of a peer closer to the destination according to its routing table and the requesting peer forwards the message to the peer closer to the destination.

The characteristics of the three routing modes are: the speed of recursive routing is high but the response message passes through many intermediate peers if the requesting peer is known; the speed of semi-recursive routing is the highest and the response message is directly routed to the requesting peer with a high efficiency but there is an issue of NAT and FW traversal if the requesting peer is behind an NAT or FW; in iterative routing, NAT and FW traversal is simple but the routing efficiency is low.

For the above routing modes, different implementations are provided in the conventional art. Taking the implementation of recursive routing as an example, a transaction based recursive routing method is provided by the conventional art. The routing principle is shown in FIG. 4.

Each peer maintains a local transaction table. When a peer forwards a request message, the peer adds a record to its transaction table and the transaction ID to the header of the message; when the peer receives a response message, the peer extracts a transaction ID from the message header and checks whether the transaction ID exists in its local transaction table; if the transaction ID exists, the peer forwards the message to the requesting peer according to the transaction record, or else the peer discards the message. With the transaction table, the peer realizes recursive routing.

During the implementation of the present invention, the inventor finds that the conventional art has at least the following weaknesses:

Because the capacity of a transaction table is limited, the number of transactions that a peer can maintain within a certain period of time is limited. If the transaction table is full, new requests will be rejected unconditionally. As a result, the peer is vulnerable to Denial of Service (DoS) attacks. Attackers may send large numbers of request messages to a specific peer so that, when the transaction table of the peer is full, the peer will no longer be able to forward messages to other peers.

SUMMARY OF THE INVENTION

Embodiments of the present invention provide a message routing method, system and peer device for the purpose of fast recursive routing in a structured P2P network.

A method for message routing in a P2P network includes: (1) when a request message is routed from a source peer to a destination peer, adding, by the source peer and an intermediate peer that needs to be recorded, path information of a local peer to the request message and forwarding the request message to a next hop until the request message arrives at the destination peer, where the path information includes a communication address of the local peer; (2) adding, by the destination peer, the path information in the request message to a response message obtained according to the request message; and (3) routing the response message from the destination peer to the source peer according to the path information.

A source peer in a P2P network includes: an initial request sending module, configured to send a request message destined for a destination peer to a next hop, where the path information includes a communication address of the source peer.

An intermediate forwarding peer in a P2P network includes: a request sending module, configured to send a request message destined for a destination peer to a next hop, and add path information of a local peer to the request message, where the path information includes a communication address of the local peer; and a response sending module, configured to send a response message to a next hop according to the path information recorded in the response message upon reception of the response message from another peer.

A destination peer in a P2P network includes: a processing module, configured to add path information in a request message to a response message obtained according to the request message; and an initial response sending module, configured to send the response message received from the processing module to a next hop according to the path information recorded in the response message.

A system for message routing in a P2P network includes: (1) a source peer, configured to add path information of a local peer to a request message destined for a destination peer and send the request message to a next-hop intermediate forwarding peer, where the path information includes a communication address of the local peer; (2) an intermediate forwarding peer, configured to send the request message destined for the destination peer to a next hop until the request message reaches the destination peer and add path information of a local peer to the request message; and configured to send a received response message to a next hop until the response message arrives at the source peer according to path information in the response message; and (3) the destination peer, configured to add the path information in the request message to the response message obtained according to the received request message and send the response message to a next-hop intermediate forwarding peer according to the path information.

Compared with the conventional art, the embodiments of the present invention have the following strengths:

With path information of message routing recorded in a P2P message, recursive message routing is implemented in a structured P2P network. A peer in the P2P network does not need to maintain a local transaction table so that resources of the peer are saved and that the cost of the P2P network is less. In addition, with routing information options, the number of routing hops is effectively reduced while NAT/FW traversal is supported.

DETAILED DESCRIPTION OF THE INVENTION

The embodiments of the present invention are described in detail with reference to the accompanying drawings.

Figure 1:
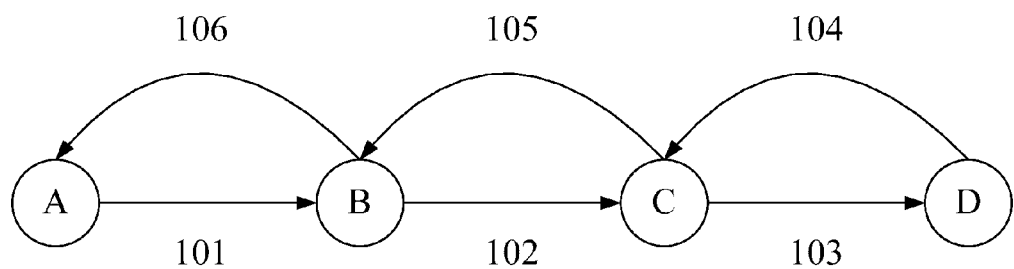
FIG. 1 shows a recursive routing process in the conventional art.
Figure 2:
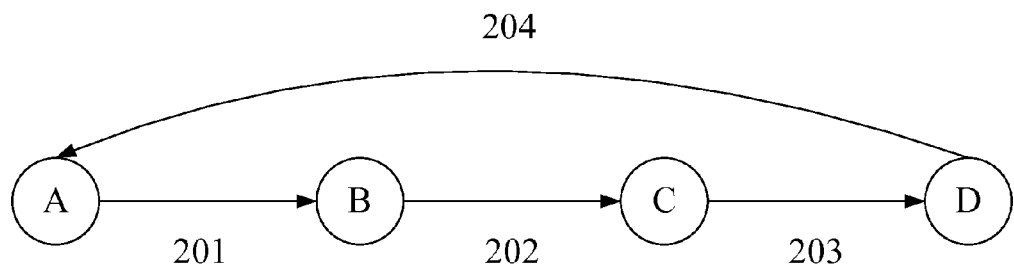
FIG. 2 shows a semi-recursive routing process in the conventional art.
Figure 3:
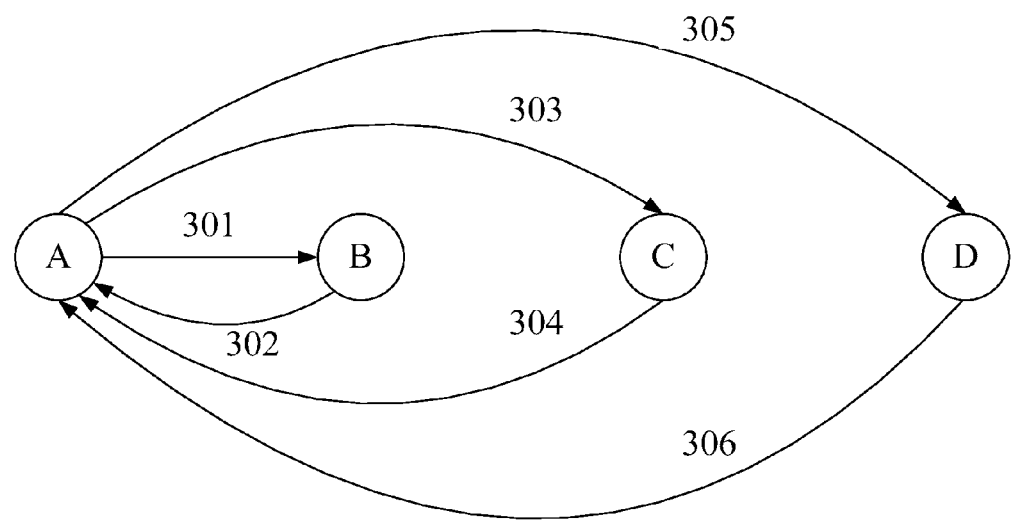
FIG. 3 shows an iterative routing process in the conventional art.
Figure 4:
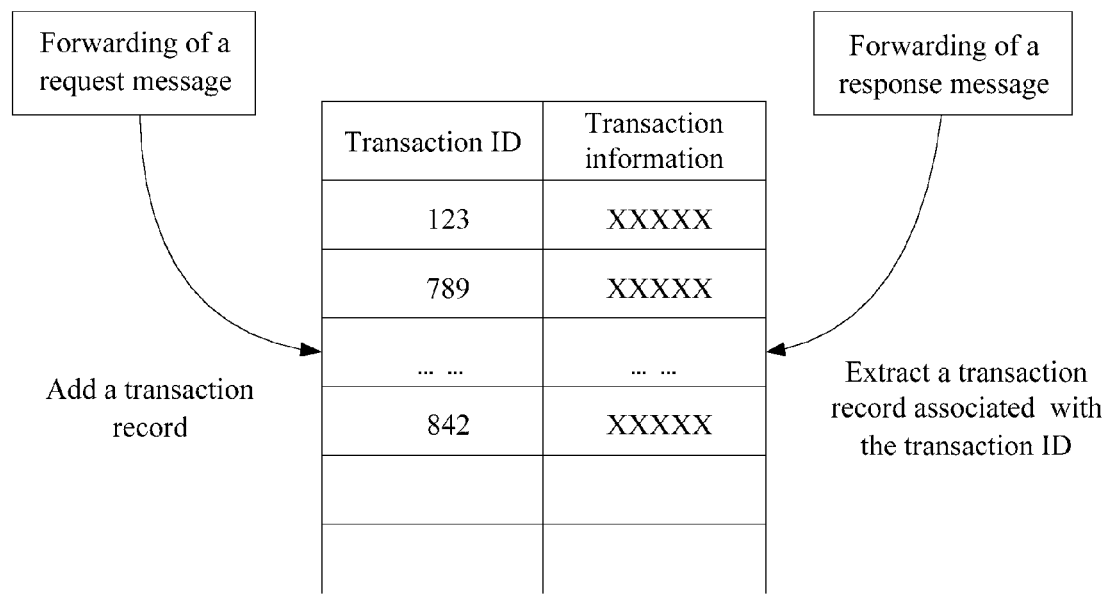
FIG. 4 shows a transaction based recursive routing process in the conventional art.
Figure 5:
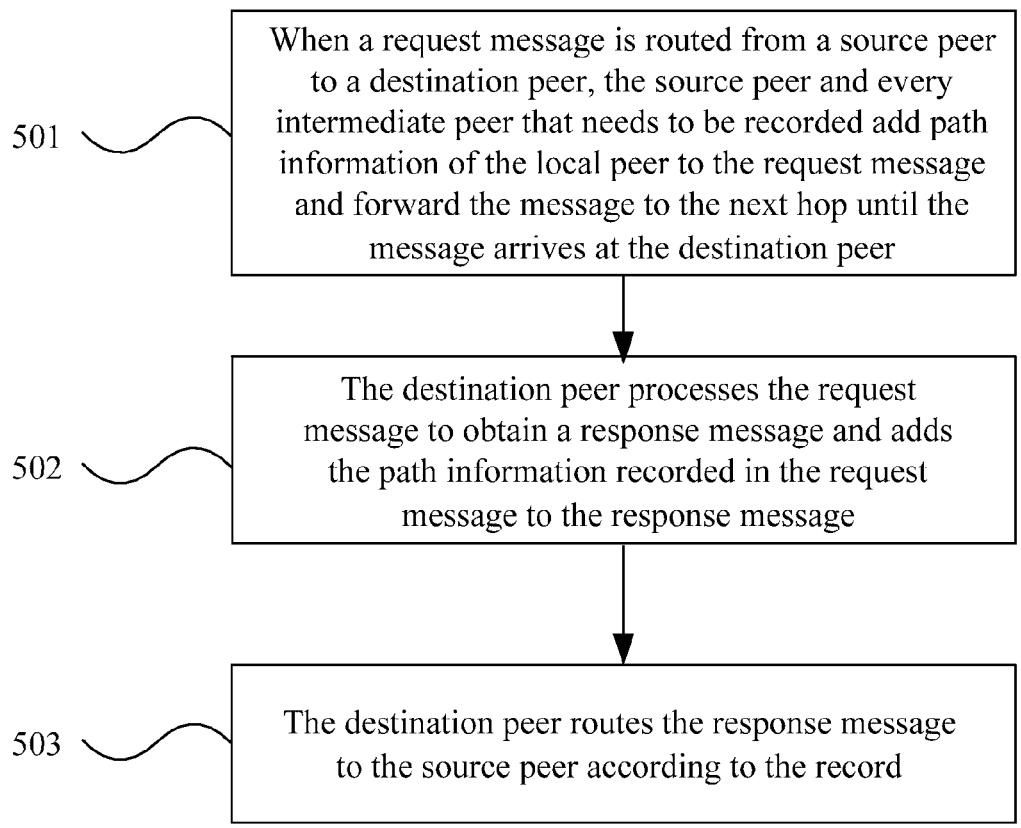
FIG. 5 shows a flowchart of a message routing method according to a first embodiment of the present invention.

A message routing method according to the first embodiment of the present invention is shown in FIG. 5. The method includes:

501. When a request message is routed from a source peer to a destination peer, the source peer and every intermediate peer that needs to be recorded add path information of the local peer to the request message and forward the message to the next hop until the message arrives at the destination peer.

With such recording, the request message stores necessary path information during routing of the message so that a peer no longer needs to record a message it forwards in the local device. The record may be stored in the header of the request message. Particularly, a path field is added to the header, and stores the communication addresses of peers that the message passes through according to the forwarding sequence of the message. The field may be managed in the form of a stack, an array, or a similar data structure. When the peers that the message passes through are recorded, the path information of the peer is inserted to the path field every time the message passes through a peer.

502. The destination peer processes the request message to obtain a response message and adds the path information recorded in the request message to the response message.

By replicating the record to the response message, the response message can be routed back to the source peer of the request message according to the recorded routing path of the request message.

503. The destination peer routes the response message to the source peer according to the record.

Particularly, a peer receiving the response message obtains information of the next-hop peer from the record and forwards the response message to the next hop until the response message arrives at the source peer.

In the second embodiment of the present invention, a path field is added to the header of a P2P request message and response message to record communication addresses of peers that the message passes through according to the routing sequence of the message. This method realizes the routing of messages.

In particular, a request message routing process according to the second embodiment of the present invention includes:

21. When a peer sends a request message, the peer generates a stack element <peer communication address> and adds its communication address in an overlay network to a header stack and forwards the message to a next-hop peer obtained from its routing table.

The peer communication address here is the address of the peer in the overlay network for communications with other peers. At present, the main bearer network is the Internet Protocol (IP) network. Therefore, the peer communication address is generally mapped to an IP address and a Transmission Control Protocol (TCP)/User Datagram Protocol (UDP) port number.

22. The peer that receives the request message checks whether the message is destined for itself and if so processes the message. Otherwise, the peer generates a stack element <peer communication address> and adds its communication address in the overlay network to the header stack, and forwards the message to the next-hop peer obtained from its routing table.

Figure 6:
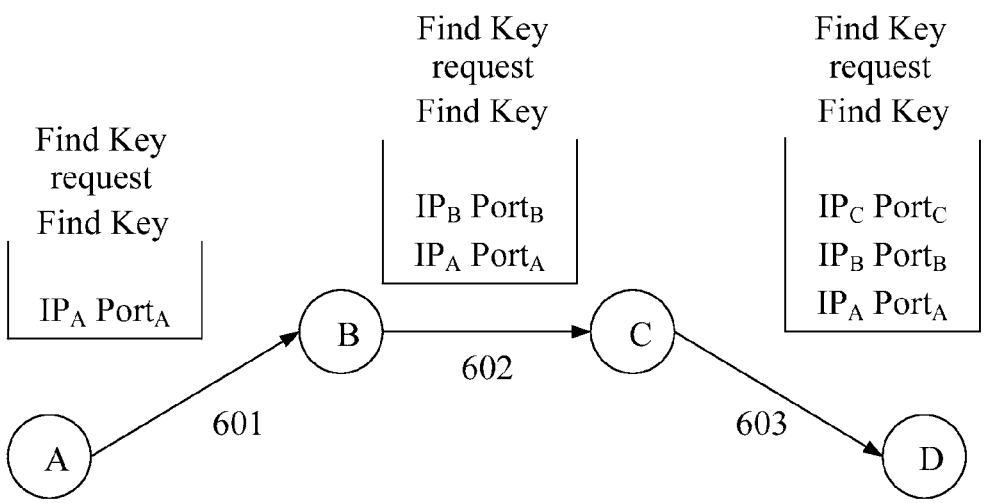
FIG. 6 shows a request message routing process according to a second embodiment of the present invention.

FIG. 6 illustrates a specific application scenario of the above request message routing process. As shown in FIG. 6, the request message routing process includes:

601. Peer A sends a request message destined for "key" (a Find Key message) and adds its IP address $IP_A$ and its protocol port number $Port_A$ to the stack structure in the request message header. Peer A obtains the next-hop peer B from its routing table according to the key and sends the request message to peer B.

602. Peer B receives the Find Key message and determines it is not the destination of the message according to the key. Peer B adds its IP address $IP_B$ and its protocol port number $Port_B$ to the stack structure in the request message header and obtains the next-hop peer C from its routing table according to the key and forwards the message to peer C.

603. Peer C receives the Find Key message and determines it is not the destination of the message according to the key. Peer B adds its IP address $IP_C$ and its protocol port number $Port_C$ to the stack structure in the request message header and obtains the next-hop peer D from its routing table according to the key and forwards the message to peer D. Peer D receives the Find Key request and determines that it is the destination of the message according to the key, and processes the request described by the message.

In particular, the process where the request message is processed to obtain a response message and the response message is routed according to the second embodiment of the present invention includes:

23. The destination peer of the request message processes the request message and generates a response message. The destination peer pops the stack top <peer communication address> from the stack structure in the message header, replicates the stack to the response header, and sends the response message to the communication address obtained from the stack top of the request message header.

24. The peer receiving the response message checks whether it is the requester of the response message and if so, the peer processes the message; or else, the peer pops the stack top <peer communication address> from the stack structure in the message header and forwards the response message to the obtained communication address.

Figure 7:
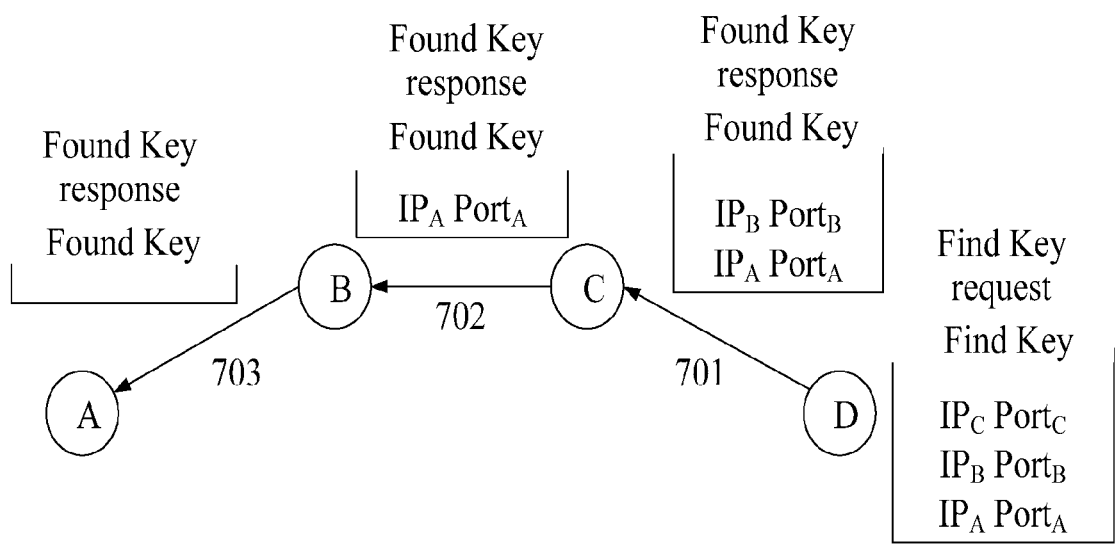
FIG. 7 shows a response message routing process according to the second embodiment of the present invention.

Taking the scenario shown in FIG. 6 as an example, FIG. 7 shows a process where peer D receives the request message, obtains the response message and routes the response message. As shown in FIG. 7, the response message routing process includes:

701. After peer D completes processing of the Find Key request, peer D generates a response message Found Key and pops the stack top <peer communication address> from the stack structure in the message header to obtain $IP_C$ and $Port_C$ and replicates the remainder of the stack to the header of the response message and sends the response message to ($IP_C$, $Port_C$).

702. After peer C receives the response message Found Key, peer C pops the stack top <peer communication address> from the stack in the response message header to obtain $IP_B$ and $Port_B$ and forwards the response to ($IP_B$, $Port_B$).

703. After peer B receives the Found Key response, peer B pops the stack top <peer communication address> from the stack in the response message header to obtain $IP_A$ and $Port_A$ and forwards the response to ($IP_A$, $Port_A$). The Found Key response finally arrives at the requesting peer A.

Figure 8:
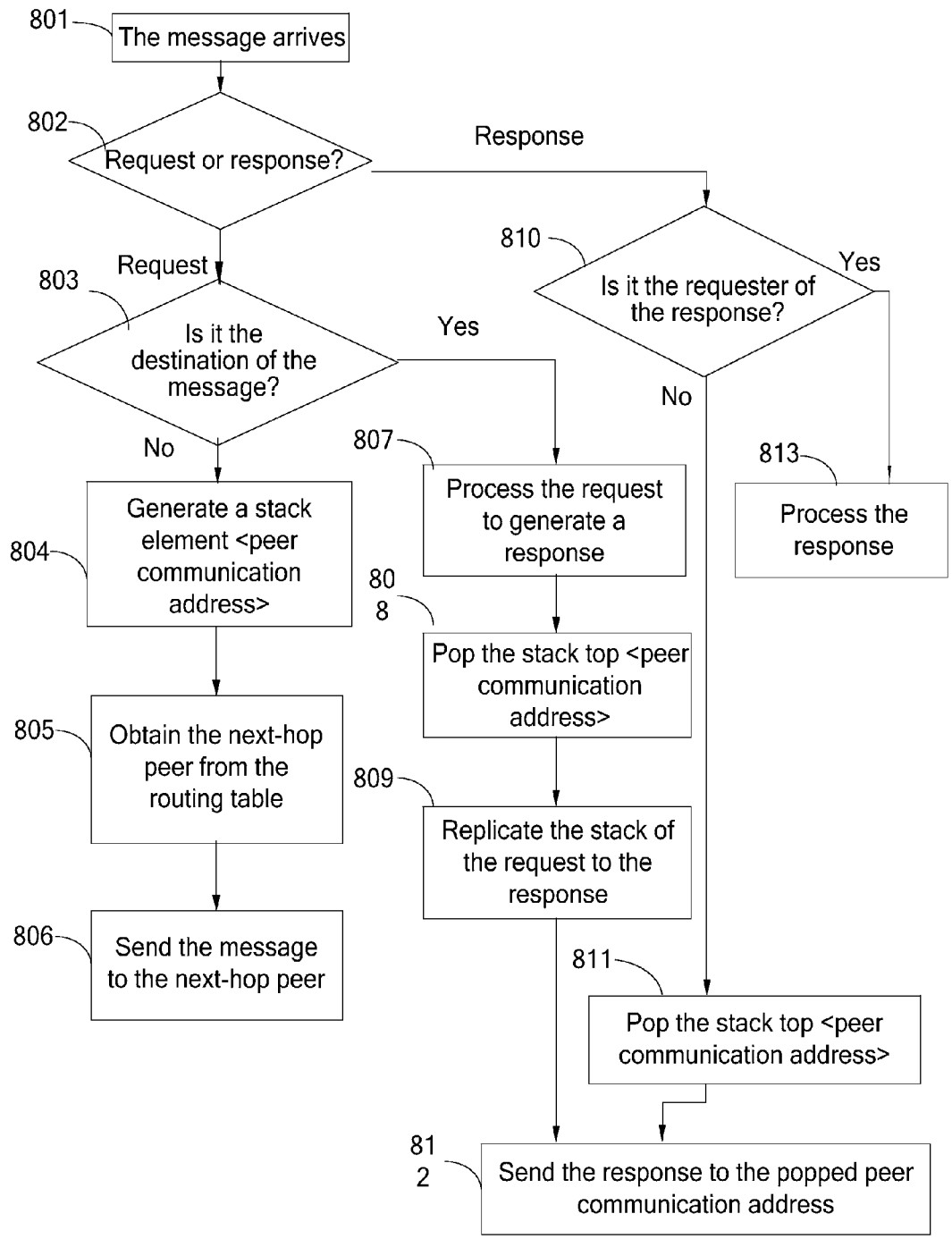
FIG. 8 shows a flowchart of message processing by a peer according to the second embodiment of the present invention.

With reference to the scenarios described in FIG. 6 and FIG. 7, FIG. 8 shows the flowchart of message processing by a peer in a structured P2P network where the peer receives a message from another peer. The flowchart includes:

801. A peer receives a message.

802. The peer judges whether the message is a request or a response. In the case of a request, the process proceeds to step 803; in the case of a response, the process goes to step 810.

803. The peer checks whether it is the destination of the request message and if so, the process goes to step 807; or else, the process proceeds to step 804.

804. The peer generates a stack element and adds the stack element to the request message.

The stack element includes the <peer communication address> of the current peer.

805. The peer obtains the next hop from its routing table.

806. The peer forwards the request message to the next hop and the process ends.

807. The peer processes the request message to obtain a response message.

808. The peer pops the stack top to obtain a <peer communication address>.

809. The peer replicates the stack of the request message to the response message and the process goes to step 812.

810. The peer checks whether it is the requester of the response message and if so, the process goes to step 813; or else, the process proceeds to step 811.

811. The peer pops the stack top to obtain a <peer communication address>.

812. The peer sends the response message to the popped peer communication address and the process ends.

813. The peer processes the response message and the process ends.

For efficient message forwarding and NAT/FW traversal and the avoidance of unsuccessful routing because of failure or leave of an intermediate peer, the third embodiment of the present invention adds a traversal flag to stack elements on the basis of the second embodiment. The traversal flag may be a behind-NAT flag or a behind-FW flag, indicating whether a peer is behind an NAT device or an FW. In particular, a path field is added to the P2P header of the request and response messages. The path field records communication addresses of peers that the message passes through according to the forwarding sequence of the message and information about whether the peers on the path are behind NAT devices or FWs. The behind-NAT flag or the behind-FW flag, taking the behind-NAT flag as an example, may have different expressions. For example, 0 indicates the peer is not behind an NAT device and 1 indicates the peer is behind an NAT device; or the flag is present if the peer is behind an NAT device and the flag is absent if the peer is not behind an NAT device. Taking the 0/1 expression as an example, the routing method in the third embodiment of the present invention is as follows.

The request message routing process includes:

31. When a peer sends a request message, the peer generates a stack element <peer communication address, behind-NAT flag> and adds its communication address in an overlay network to a header stack and forwards the message to a next-hop peer obtained from its routing table. The behind-NAT flag indicates whether the peer is behind an NAT device or an FW. 0 indicates the peer is not behind an NAT device or an FW; 1 indicates the peer is behind an NAT device or an FW.

32. The peer receiving the request message checks whether the message is destined for itself and if so, the peer processes the message. Otherwise, the peer generates a stack element <peer communication address, behind-NAT flag> and adds its communication address in the overlay network to the header stack, and forwards the message to the next-hop peer obtained from its routing table.

Figure 9:
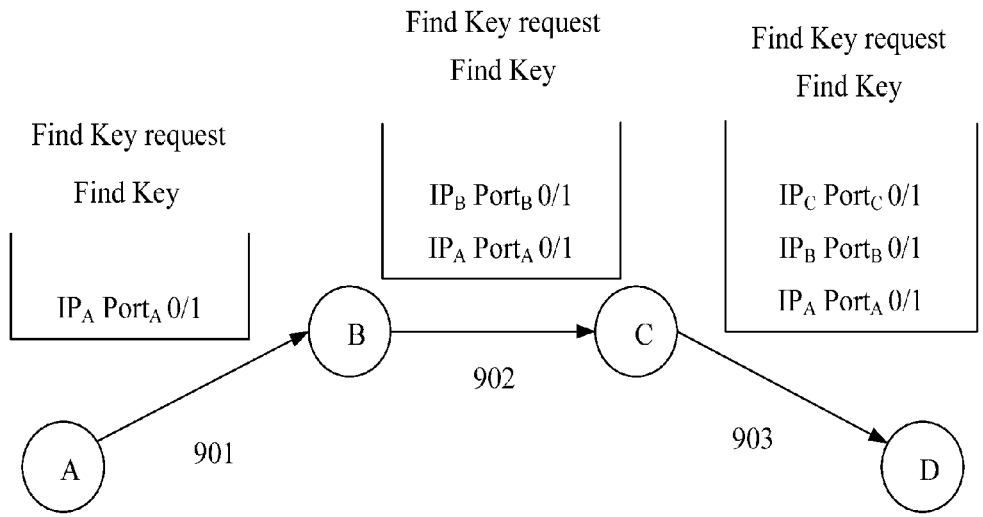
FIG. 9 shows a request message routing process according to a third embodiment of the present invention.

FIG. 9 illustrates a specific application scenario of the above request message routing process. As shown in FIG. 9, the request message routing process includes:

901. Peer A sends a request message destined for key (a Find Key message), and adds its IP address $IP_A$, protocol port number $Port_A$ and behind-NAT flag to the stack structure in the request message header. Peer A obtains the next-hop peer B from its routing table according to the key and sends the request message to peer B.

902. Peer B receives the Find Key message and determines it is not the destination of the message according to the key. Peer B adds its IP address $IP_B$, protocol port number $Port_B$ and behind-NAT flag to the stack structure in the request message header. Peer B obtains the next-hop peer C from its routing table according to the key and forwards the request message to peer C.

903. After peer C receives the Find Key request, peer C determines it is not the destination of the message according to the key and adds its IP address $IP_C$, protocol port number $Port_C$ and behind-NAT flag to the stack structure in the request message header. Peer C obtains the next-hop peer D from its routing table according to the key and forwards the request message to peer D. After peer D receives the Find Key request message, peer D determines it is the destination of the message according to the key and processes the request described by the message.

In particular, the process where the request message is processed to obtain a response message and the response message is routed according to the third embodiment of the present invention includes:

33. The destination peer of the message completes processing the message and pops the stack top <peer communication address, behind-NAT flag> from the stack structure in the request message header. The destination peer replicates the stack to the response message header and sends the response message to the communication address obtained from the stack top of the request message header.

34. The peer receiving the response message checks whether it is the requester of the response message and if so, the peer processes the message; or else, the peer pops the stack top <peer communication address, behind-NAT flag> from the stack structure in the message header and forwards the response message to the obtained communication address.

Figure 10:
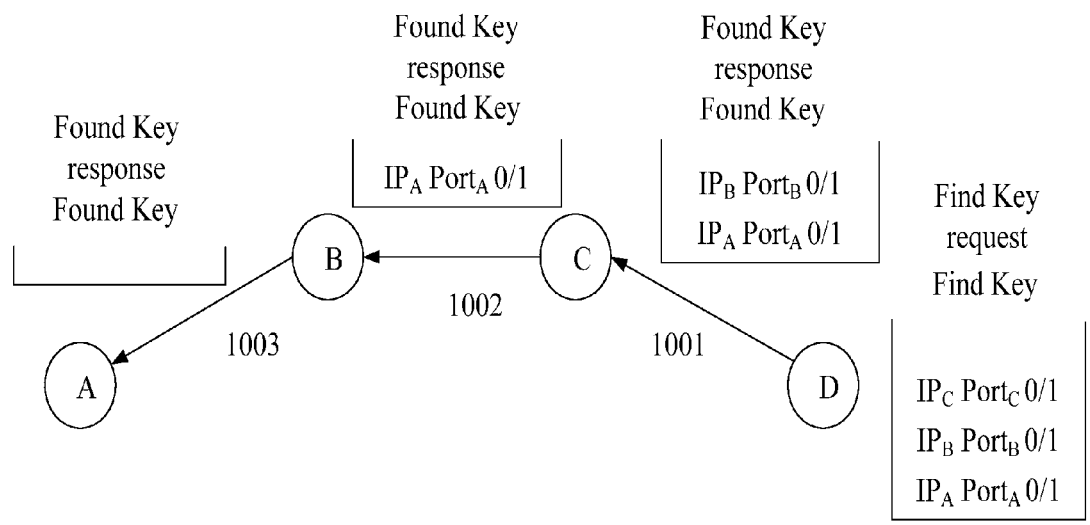
FIG. 10 shows a response message routing process according to the third embodiment of the present invention.

Taking the scenario shown in FIG. 9 as an example, FIG. 10 shows a process where peer D receives the request message, obtains the response message and routes the response message. As shown in FIG. 10, the process of obtaining the response message according to the request message and routing the response message includes:

1001. After peer D completes processing of the Find Key request, peer D generates a response message Found Key and pops the stack top <peer communication address, behind-NAT flag> from the message header stack to obtain $IP_C$ and $Port_C$ and replicates the remainder of the stack to the header of the response message and sends the response message to ($IP_C$, $Port_C$).

1002. After peer C receives the response message Found Key, peer B pops the stack top <peer communication address, behind-NAT flag> from the stack in the response message header to obtain $IP_B$ and $Port_B$ and forwards the response to ($IP_B$, $Port_B$).

1003. After peer B receives the Found Key response, peer B pops the stack top <peer communication address, behind-NAT flag> from the stack in the response message header to obtain $IP_A$ and $Port_A$ and forwards the response to ($IP_A$, $Port_A$). The Found Key response finally arrives at the requesting peer A.

Figure 11:
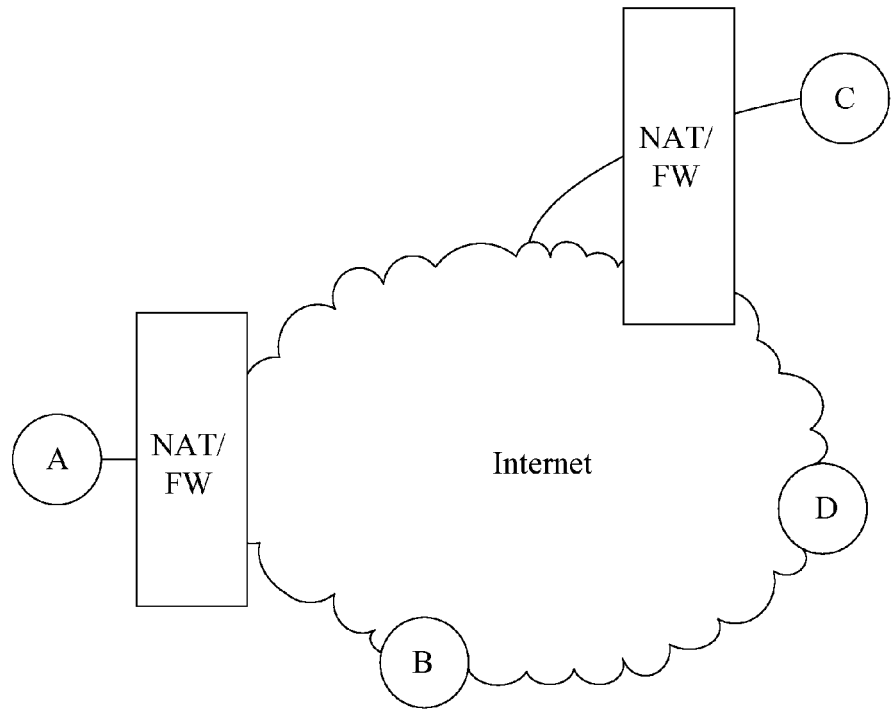
FIG. 11 shows a network scenario where embodiments of the present invention apply.

In the third embodiment of the present invention, a traversal flag is added to stack elements so that the process of request message and response message routing is optimized according to the traversal flag. The traversal flag may be a behind-NAT flag or a behind-FW flag, indicating whether a peer is behind an NAT device or an FW. Such optimization is based on the following property of a P2P network in a conventional art:

As shown in FIG. 11, a request message is routed from the source peer A to the destination peer D along the path of peer A, peer B, peer C and peer D. The following description assumes that peer A and peer C are behind NAT devices or FWs. During routing of the request message, the method for obtaining the next hop includes: each peer performs calculation according to the algorithm adopted by the P2P network to obtain its routing table and establishes connections with peers in the routing table. No matter whether a peer in the routing table is behind an NAT device or an FW, connections can be established. This is guaranteed by the P2P network and other methods such as traversal methods like Simple Traversal of User Datagram Protocol through NAT (STUN), Traversal Using Relay NAT (TRUN) and Interactive Connectivity Establishment (ICE). This method guarantees that the request message is routed from the source peer A to the destination peer D by way of peer B and peer C. During the process, connectivity is always maintained in the one-way path.

After peer A behind an NAT device or an FW sends a routing message to the peer B, the one-way message path from peer B to peer A is in connectivity. This is because peer B is able to send a message to peer A after peer A has sent a message to peer B even if the NAT device before peer A is a strictly symmetric NAT device or FW that is the hardest to traverse. But peer C and peer D will possibly be unable to send a message to peer A because peer A has not sent a message directly to peer C or peer D. Therefore, a message from peer C or peer D to peer A may not arrive at peer A in the case of some types of NAT devices (like symmetric NAT devices). In this case, because it is difficult to know the type of a NAT device to traverse in practice, messages sent to peer A must be forwarded by peer B to guarantee that peer A receives the messages destined for it.

As for a peer not behind an NAT device or an FW, peer B for example, because the peer is located in a public network, besides peer C that has sent a message to peer B, peer D will also be able to send a message directly to peer B if peer D knows the address of peer B.

Based on the above characteristic in the conventional art, in the embodiment of the present invention, when path information includes a traversal flag (behind-NAT flag or behind-FW flag), the routing of request and response messages is optimized.

Figure 12:
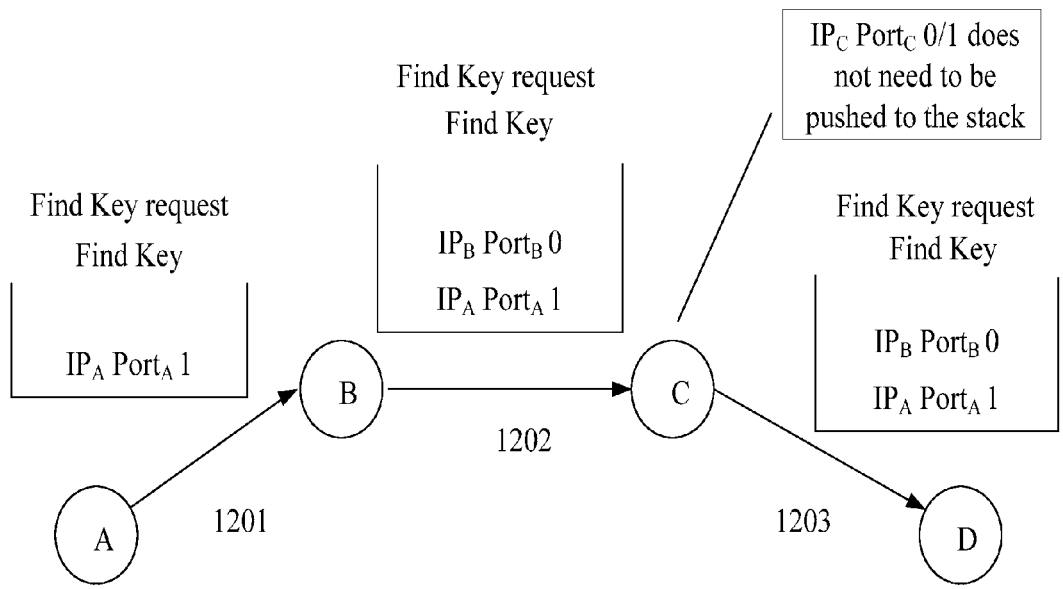
FIG. 12 shows an optimized request message routing process according to the third embodiment of the present invention.

For example, the routing of a request message is optimized as follows:

When a peer forwards the request message, if the behind-NAT flag in the header stack top <peer communication address, behind-NAT flag> is 0 (which means the behind-NAT flag of the peer that last adds path information is 0), the peer will not push its <peer communication address, behind-NAT flag> to the stack. The optimization is illustrated in FIG. 12.

1201. Peer A sends a request message destined for key (a Find Key message), and adds its IP address $IP_A$, protocol port number $Port_A$ and behind-NAT flag 1 to the stack structure in the request message header. Peer A obtains the next-hop peer B from its routing table according to the key and sends the request message to peer B.

1202. Peer B receives the Find Key message and determines it is not the destination of the message according to the key and that the behind-NAT flag on the stack top is 1. Peer B adds its IP address IPB, protocol port number PortB and behind-NAT flag 0 to the stack structure in the request message header and obtains the next-hop peer C from its routing table according to the key and forwards the request message to peer C.

1203. After peer C receives the Find Key request, peer C determines it is not the destination of the message according to the key and that the behind-NAT flag on the stack top is 0. Peer C obtains the next-hop peer D from its routing table according to the key and forwards the request message to peer D. After peer D receives the Find Key request message, peer D determines it is the destination of the message according to the key and processes the request described by the message.

In the process, information of peer C is not included in the request message received by peer D. This is because peer B is not behind an NAT device and according to the conventional art, if peer D sends a response message directly to peer B, NAT traversal is unnecessary and peer B will receive the response message from peer D directly. The number of routing hops is thus reduced and the routing speed is higher. In the case of peer A, because peer A is located behind an NAT device, even if peer D already knows the path information of peer A, according to the above description of the conventional art with reference to FIG. 11, peer D must still send a response message to peer B before peer B forwards the message to peer A so as to guarantee that the response message arrives at peer A.

Figure 13:
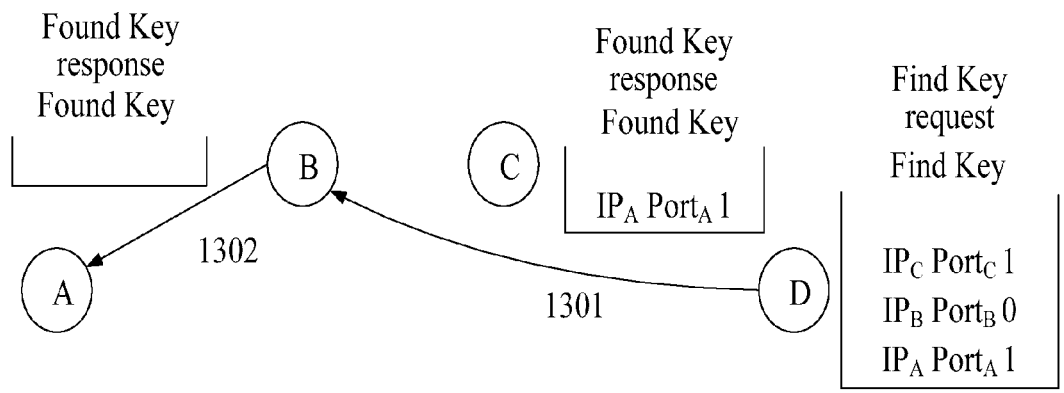
FIG. 13 shows an optimized response message routing process according to the third embodiment of the present invention.

For another example, the routing of a response message is optimized as follows:

When a peer forwards a response message, the peer pops the lowest <peer communication address, behind-NAT flag> with the behind-NAT flag being 0 from the header stack and sends the response message to the obtained communication address. The optimization method is illustrated in FIG. 13.

1301. After peer D completes processing of the Find Key request, peer D generates a response message Found Key and continuously pops the stack top <peer communication address, behind-NAT flag> from the message header stack until it obtains the lowest <peer communication address, behind-NAT flag> with the behind-NAT flag being 0, namely, $IP_B$ and $Port_B$. Peer D replicates the remainder of the stack to the header of the response message and sends the response message to ($IP_B$, $Port_B$).

1302. After peer B receives the Found Key response, peer B pops the stack top <peer communication address, behind-NAT flag> from the stack in the response message header to obtain $IP_A$ and $Port_A$ and forwards the response to ($IP_A$, $Port_A$). The Found Key response finally arrives at the requesting peer A.

In the process, the routing of the response message does not pass through peer C. Because peer B is not behind an NAT device, when peer D sends the response message directly to peer B, NAT traversal is unnecessary and peer B will directly receive the response message sent by peer D without passing through peer C. In this way, the number of routing hops is smaller and the speed of message routing is higher.

During the routing of a response message, a peer may fail to send or forward the response message to the stack top <peer communication address, behind-NAT flag>. In this case, the peer may pop another <peer communication address, behind-NAT flag> from the stack to make another forwarding attempt. The method for popping another <peer communication address, behind-NAT flag> is as follows:

The peer pops the next <peer communication address, behind-NAT flag> from the stack and sends the response message to the communication address; or the peer continuously pops <peer communication address, behind-NAT> from the stack until it detects an address with the behind-NAT flag being 0 and sends the response message to the communication address.

Figure 14:
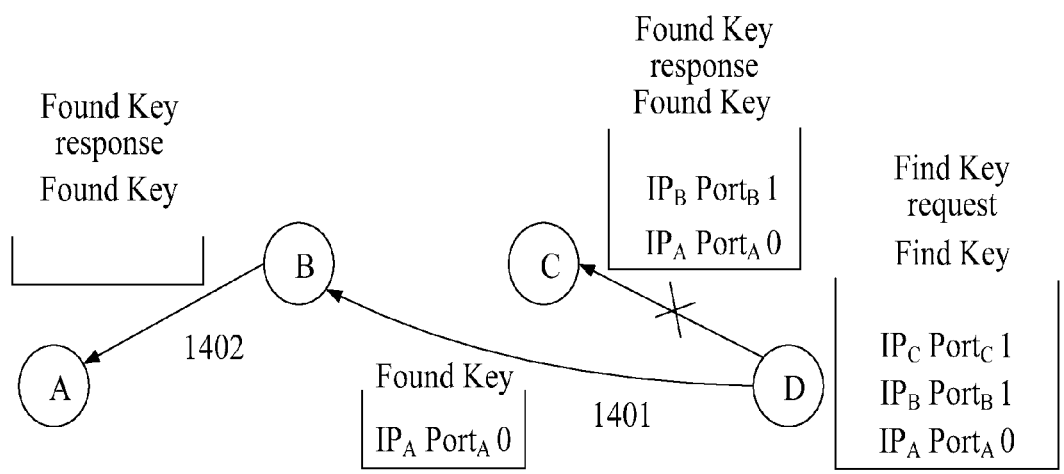
FIG. 14 shows a response message routing process where sending the response message fails according to the third embodiment of the present invention.

The first option is shown in FIG. 14, including:

1401. After peer D completes processing of the Find Key request, peer D generates a response message Found Key and pops the stack top <peer communication address, behind-NAT flag> from the message header stack to obtain $IP_C$ and $Port_C$ and replicates the remainder of the stack to the header of the response message and sends the response message to ($IP_C$, $Port_C$). If sending the message fails, peer D pops the next stack top <peer communication address, behind-NAT flag> from the response message header to obtain $IP_B$ and $Port_B$ and sends the response message to ($IP_B$, $Port_B$).

1402. After peer B receives the Found Key response, peer B pops the stack top <peer communication address, behind-NAT flag> from the stack in the response message header to obtain $IP_A$ and $Port_A$ and forwards the response to ($IP_A$, $Port_A$). The Found Key response finally arrives at the requesting peer A.

If peer D is a forwarding peer, peer D may also attempt to forward the response message to peer B in this method.

Figure 15:
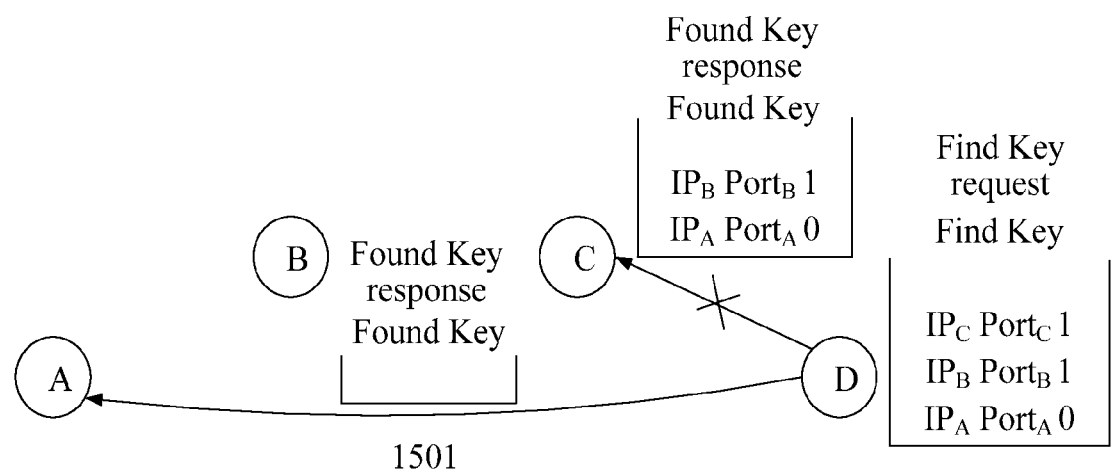
FIG. 15 shows another response message routing process where sending the response message fails according to the third embodiment of the present invention.

The second option is shown in FIG. 15, including:

1501. After peer D completes processing of the Find Key request, peer D generates a response message Found Key and pops the stack top <peer communication address, behind-NAT flag> from the message header stack to obtain $IP_C$ and $Port_C$ and replicates the remainder of the stack to the header of the response message and sends the response message to ($IP_C$, $Port_C$). If sending the message fails, peer D pops the next stack top <peer communication address, behind-NAT flag> from the response message header to detect the <peer communication address, behind-NAT flag> with the behind-NAT flag being 0, namely, $IP_A$ and $Port_A$. Peer D sends the response message to ($IP_A$, $Port_A$). The response message Found Key finally reaches the requesting peer A.

If peer D is a forwarding peer, peer D may also attempt to forward the response message to peer B in this method.

According to the message routing methods provided in the foregoing embodiments of the present invention, path information of message routing is recorded in a P2P message so as to implement recursive routing of the message in a structured P2P network. With the methods, a peer in the P2P network does not need to maintain a local transaction table so that resources of the peer are saved and that the cost of the P2P network is less. In addition, with the routing information option, the number of routing hops is effectively reduced while NAT/FW traversal is supported and the impact of failure of an intermediate peer on routing is reduced.

Figure 16:
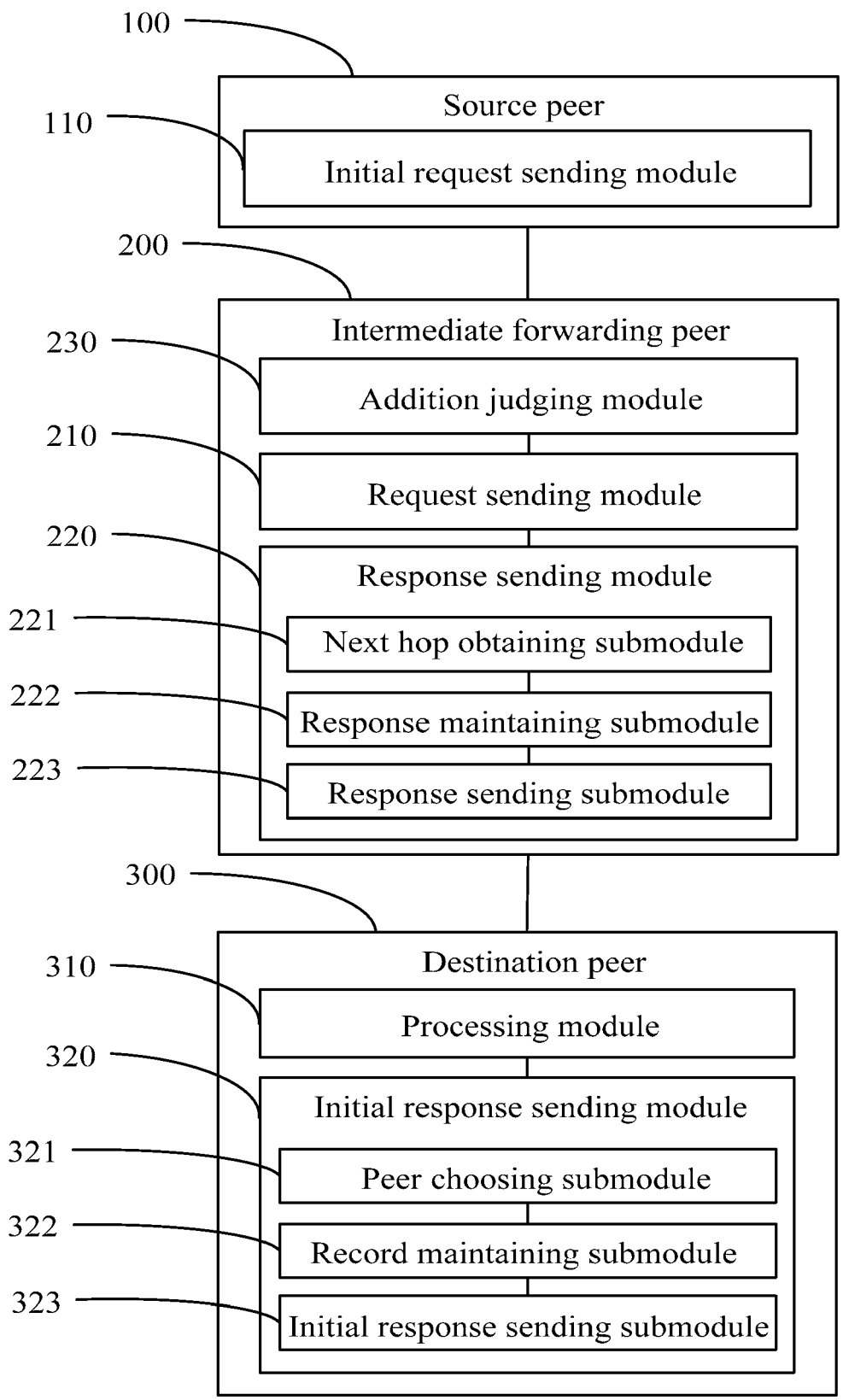
FIG. 16 shows a structure of a message routing system according to a fourth embodiment of the present invention.

The fourth embodiment of the present invention provides a message routing system, including a source peer, intermediate forwarding peers and a destination peer. For example, in the case that a message is routed by way of only one intermediate forwarding peer, a structure of the system is shown in FIG. 16, including a source peer 100, an intermediate forwarding peer 200 and a destination peer 300.

The source peer 100 is configured to send a request message destined for the destination peer 300 to the next hop. The path information includes the communication address as well as the traversal flag of the source peer 100 (behind-NAT flag or behind-FW flag).

The intermediate forwarding peer 200 is configured to forward the request message destined for the destination peer 300 to the next hop and record path information of itself in the request message; or configured to send a response message to the next hop according to path information of the response message.

The destination peer 300 is configured to: generate a response message according to the request message from the source peer 100 and add the path information recorded in the request message to the response message, and send the response message to the next hop according to the path information in the response message.

In particular, as shown in FIG. 16, the source peer 100 includes: an initial request sending module 110, configured to send a request message destined for the destination peer 300 to a next hop, where the path information includes the communication address as well as the traversal flag of the source peer 100 (behind-NAT flag or behind-FW flag).

In particular, as shown in FIG. 16, the intermediate forwarding peer 200 includes: (1) a request sending module 210, configured to: send the request message destined for the destination peer to the next hop and record path information of the local peer in the request message according to the routing sequence; (2) a response sending module 220, configured to send a response message to the next hop according to the path information recorded in the response message upon reception of the response message from another peer; and (3) an addition judging module 230, configured to: instruct the request sending module 200 to add path information of the local peer to the request message when determining that the peer last adding path information has a traversal flag, or else instruct the request sending module 200 not to add path information of the local peer to the request message.

The response sending module 220 further includes: (1) a next hop obtaining submodule 221, configured to obtain the next hop for routing of the response message and notify a response sending submodule 223 of the next hop; (2) a response maintaining submodule 222, configured to remove path information of the next hop chosen by the next hop obtaining submodule 221 recorded in the response message and path information of peers recorded after the path information of the next hop; and (3) the response sending submodule 223, configured to send the response message maintained by the response maintaining submodule 222 to the next hop chosen by the next hop obtaining submodule 221.

In particular, as shown in FIG. 16, the destination peer 300 includes: (1) a processing module 310, configured to process the request message to obtain a response message and add the path information recorded in the request message to the response message; and (2) an initial response sending module 320, configured to send the response message received from the processing module 310 to the next hop according to the path information recorded in the response message.

A peer choosing submodule 321 is configured to choose the next hop according to the record in the response message.

A record maintaining submodule 322 is configured to remove path information of the next hop chosen by the peer choosing submodule 321 recorded in the response message and path information of peers recorded after the path information of the next hop.

An initial response sending submodule 323 is configured to send the response message maintained by the record maintaining submodule 322 to the next hop chosen by the peer choosing submodule 321.

In the system, the request message may also be routed from the source peer directly to the destination peer when no intermediate forwarding peer is present. This has no impact on the function or structure of the source peer and the destination peer. In addition, the above description concerns a process where the source peer sends a request to the destination peer and receives a response. In this particular scenario, every concerned peer has a single function. In practical scenarios, however, one peer may play different roles so that every peer in a P2P network must simultaneously have functions of the source peer, intermediate forwarding peer and destination peer. The structure of such a multi-function peer is the sum of the functions of the above source peer, intermediate peer and destination peer.

With the message routing system and peer device provided in the foregoing embodiments of the present invention, path information of message routing is recorded in a P2P message so as to implement recursive routing of the message in a structured P2P network. With the methods, a peer in the P2P network does not need to maintain a local transaction table so that resources of the peer are saved and that the cost of the P2P network is less. In addition, with the routing information option, the number of routing hops is effectively reduced while NAT/FW traversal is supported and the impact of failure of an intermediate peer on routing is reduced.

Through the preceding description of embodiments of the present invention, it is understandable to those skilled in the art that embodiments of the present invention may be implemented by hardware or by software in combination with a necessary hardware platform. Thus, the technical solution of the present invention may be made into software. The software may be stored in a non-volatile storage medium (for example, a CD-ROM, a USB disk, and a mobile hard disk), and include several instructions that instruct a computer device (such as a personal computer, a server, or a network device) to perform the methods provided in the embodiments of the present invention.

The foregoing embodiments are exemplary embodiments of the present invention only and not intended to limit the present invention. Any modification, equivalent substitution or improvement without departing from the principle of the present invention should be covered in the scope of protection of the present invention.

What is claimed is:

1. A method for message routing in a Peer to Peer (P2P) network, comprising:
while routing a request message from a source peer to a destination peer, adding to the request message path information of a local peer when a peer that last adds the path information to the request message has a traversal flag and omitting adding the path information of the local peer to the request message when the traversal flag is absent from the peer that last adds the path information;

forwarding the request message to a next hop until the request message arrives at the destination peer, wherein the path information comprises a communication address of the local peer;

adding, by the destination peer, the path information in the request message to a response message obtained according to the request message; and routing the response message from the destination peer to the source peer according to the path information.

2. The method of claim 1, wherein the path information further comprises the traversal flag.

3. The method of claim 2, wherein the routing the response message from the destination peer to the source peer according to the path information comprises:

obtaining path information of a next hop for routing of the response message according to the path information recorded in the response message;

removing the path information of the next hop recorded in the response message and path information of a peer which adds path information after the path information of the next hop; and sending the response message to the next hop according to the path information of the next hop.

4. The method of claim 3, after sending the response message to the next hop, further comprising:

obtaining a hop next to the next hop according to the record in the response message if sending the response message fails;

removing path information of the hop next to the next hop from the record of the response message; and sending the response message to the hop next to the next hop.

5. The method of claim 3, wherein the path information of the next hop comprises at least one of the following:

path information of a peer that last adds path information to the request message;

path information of a peer without the traversal flag that last adds the path information to the request message; and path information of a peer without the traversal flag that first adds the path information to the request message.

6. The method of claim 4, wherein the path information of the next hop comprises at least one of the following:

path information of a peer that last adds path information to the request message;

path information of a peer without the traversal flag that last adds the path information to the request message; and path information of a peer without the traversal flag that first adds the path information to the request message.

7. The method of claim 2, wherein:

the peer with the traversal flag is behind a Network Address Translation (NAT) device or a Firewall (FW).

8. An intermediate forwarding peer in a Peer to Peer (P2P) network, comprising:

a request sending module, configured to send a request message destined for a destination peer to a next hop, and add path information of a local peer to the request message, wherein the path information comprises a communication address of the local peer;

an addition judging module configured to instruct the request sending module to add the path information of the local peer to the request message when a peer that last adds the path information to the request message has a traversal flag and omit adding the path information of the local peer to the request message when the traversal flag is absent from the peer that last adds the path information; and a response sending module, configured to send a response message to a next hop according to the path information recorded in the response message upon reception of the response message from another peer.

9. The intermediate forwarding peer of claim 8, wherein the response sending module comprises:

a next hop obtaining submodule, configured to obtain a next hop for routing of the response message and notify a response sending submodule of the next hop;

a response maintaining submodule, configured to remove path information of the next hop chosen by the next hop obtaining submodule recorded in the response message and path information of a peer recorded after the path information of the next hop; and the response sending submodule, configured to send the response message maintained by the response maintaining submodule to the next hop chosen by the next hop obtaining submodule.

10. A destination peer in a Peer to Peer (P2P) network, comprising:

a processing module, configured to add path information in a request message to a response message obtained according to the request message, where the path information includes a traversal flag when a peer in the path information is behind a Network Address Translation (NAT) device or a Firewall (FW) and omit adding the path information of the local peer to the request message when the traversal flag is absent from the peer that last adds the path information; and an initial response sending module, configured to send the response message received from the processing module to a next hop according to the path information recorded in the response message.

11. The destination peer of claim 10, wherein the initial response sending module comprises:

a peer choosing submodule, configured to choose the next hop according to the record in the response message;

a record maintaining submodule, configured to remove path information of the next hop chosen by the peer choosing submodule recorded in the response message and path information of a peer recorded after the path information of the next hop; and an initial response sending submodule, configured to send the response message maintained by the record maintaining submodule to the next hop chosen by the peer choosing submodule.

12. A system for message routing in a Peer to Peer (P2P) network, comprising:

a source peer, configured to add path information of a local peer to a request message destined for a destination peer and send the request message to at least one next-hop intermediate forwarding peer, wherein the path information comprises a communication address of the local peer;

the next-hop intermediate forwarding peer, configured to send the request message destined for the destination peer to a next hop until the request message reaches the destination peer and add the path information of the local peer to the request message when a peer that last adds path information to the request message has a traversal flag and omit adding the path information of the local peer to the request message when the traversal flag is absent from the peer that last adds the path information; and configured to send a received response message to a next hop until the response message arrives at the source peer according to path information in the response message; and the destination peer, configured to add the path information in the request message to the response message obtained according to the received request message and send the response message to a next-hop intermediate forwarding peer according to the path information.

13. The system of claim 12, the next-hop intermediate forwarding peer comprises at least one of the following:

each intermediate peer that the request message passes through when the request message is routed from the source peer to the destination peer; and one of the intermediate peers finding upon reception of the request message that a peer which last adds path information in the request message has the traversal flag.

14. The system of claim 12, wherein the path information further comprises the traversal flag.

* * * * *